Figure 1:
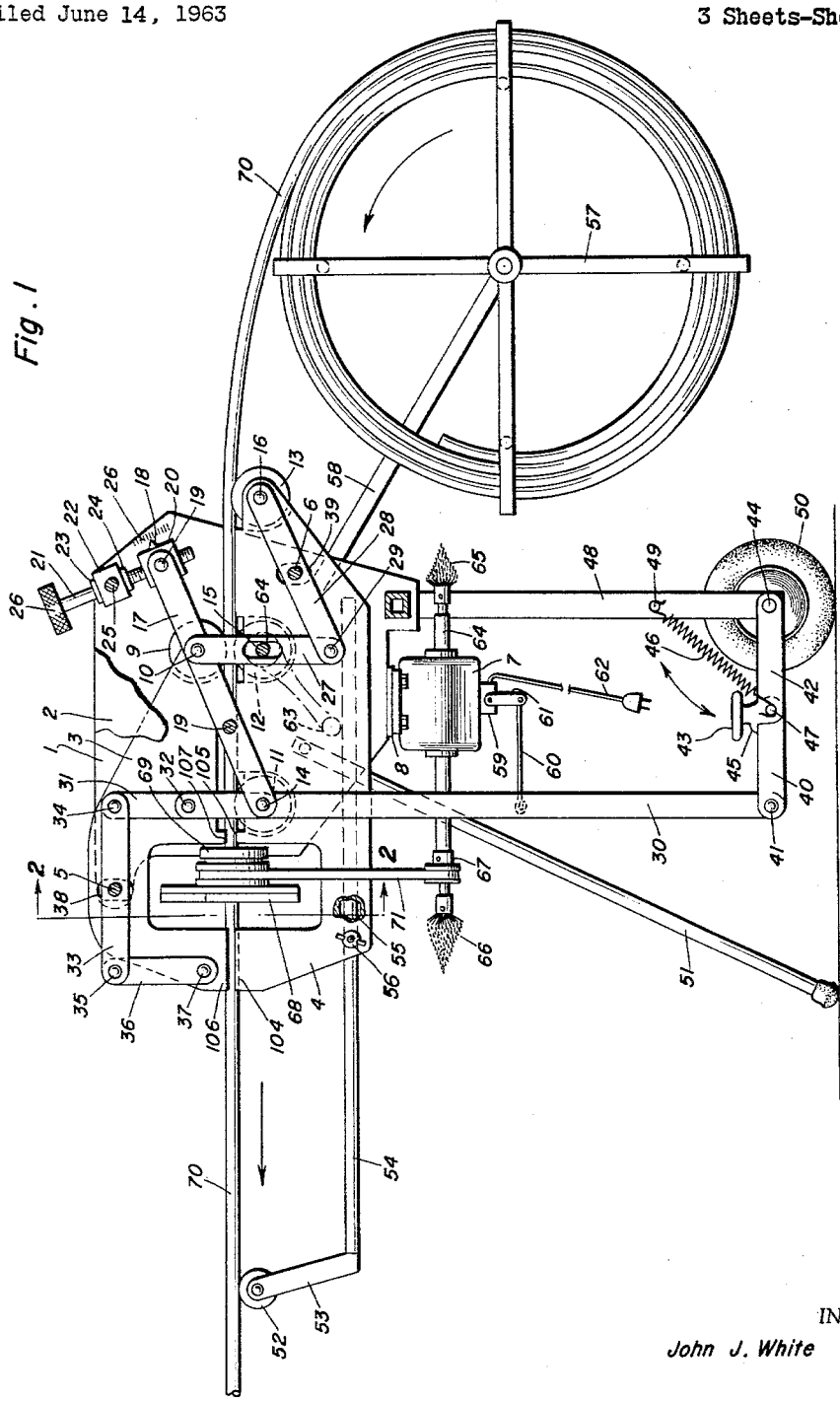

March 29, 1966 J. J. WHITE 3,242,566
TUBE CUTTING MACHINE
Filed June 14, 1963 3 Sheets-Sheet 2

INVENTOR
John J. White

BY [signature: John J. White]

March 29, 1966 J. J. WHITE 3,242,566
TUBE CUTTING MACHINE
Filed June 14, 1963 3 Sheets-Sheet 3

INVENTOR
John J. White
BY

United States Patent Office 3,242,566
Patented Mar. 29, 1966

1

3,242,566
TUBE CUTTING MACHINE
John J. White, 7405 Glenbrook Road, Bethesda, Md.
Filed June 14, 1963, Ser. No. 288,028
8 Claims. (Cl. 29—566)

The present invention relates in general to devices used for cutting a preselected length of material from either a straight length or coil of round rod, bar, or tubular stock. The invention relates more particularly to machines or devices used for the cutting to length of ferrous and non-ferrous tubing used in the plumbing, refrigeration, and electrical trades.

The prerequisites of a proper tube cutoff for use in the trades mentioned are as follows: the cut shall be perpendicular to the axis of the tube, no burrs shall be present either on the outside or inside diameters, and the outside of the tube shall be free of oxides or other foreign matter for a distance back from the end at least equal to the depth of the finished counterbore or socket in the tube fitting. The reasons for these requirements are: the presence of burrs or a necked-down inside diameter on a tube end not only impedes the flow of liquids but also traps wastes and foreign matter entrained in the liquids, and often results in the eventual stoppage of the tube. The presence of burrs or oxides on the outside diameter of the tube impedes or prevents the insertion of the tube end into tube fittings, and/or prevents proper adhesion of the solder. An ineffective solder joint will leak and not only result in expensive rework but also result in expensive water damage at times.

The most commonly used method of tube preparation is the entirely manual one of cutting the tubing with a hack saw, deburring with a hand scraper, and polishing with sand paper or sand cloth. The semi-automatic methods employed heretofore for cutting such tubing either do not attempt to do the job completely, or deform, burr, or otherwise render the workpiece unsuitable for its intended purpose until it is reworked by laborious and expensive manual or semi-manual means. Perhaps the most widely accepted machine designed for this purpose utilizes the time honored principle of supporting the tube on powered rollers which rotate the tube against a rotating, knife-like cutter. This lenticular cutter is fed into the periphery of the tube by a manually operated screw. This type of cutoff operation invariably results in a reduction in the inside diameter of the tube and a sharp burr at the cutoff due to the pressure of the cutter. Such machines are usually equipped with power operated, tapered reamers over which the ends of the tubing are thrust manually to remove the burr and to restore the inside diameter of the tube to some semblance of its original size. In addition to this it is also necessary to polish the outside diameter of the tube by holding it, and rotating it against a powered, rotating wire brush. This wire brush may also be used to polish the inside diameter of tube fittings. Thus it can be seen that no fewer than five separate and distinct operations are involved in preparing the ends of a single length of tubing for installation. These operations involve the cumbersome procedure of turning a length of tubing end for end, a process often impossible of accomplishment in cramped quarters and which, therefore, often precludes the use of the machine in the most convenient and economical location.

2

The objects of this invention are as follows: to provide a machine which will, in one automatic sequence, cut tubing and fully prepare both resulting, adjacent, ends for immediate installation, to provide a machine of this nature which is light and portable and can be moved about easily by one man. Another object of the invention is to provide a tube cutting machine which will enable an operator to obtain straight lengths of tubing with fully prepared ends from conventional coils of tubing which are obtainable in lengths of up to several hundred feet.

Figure 3:
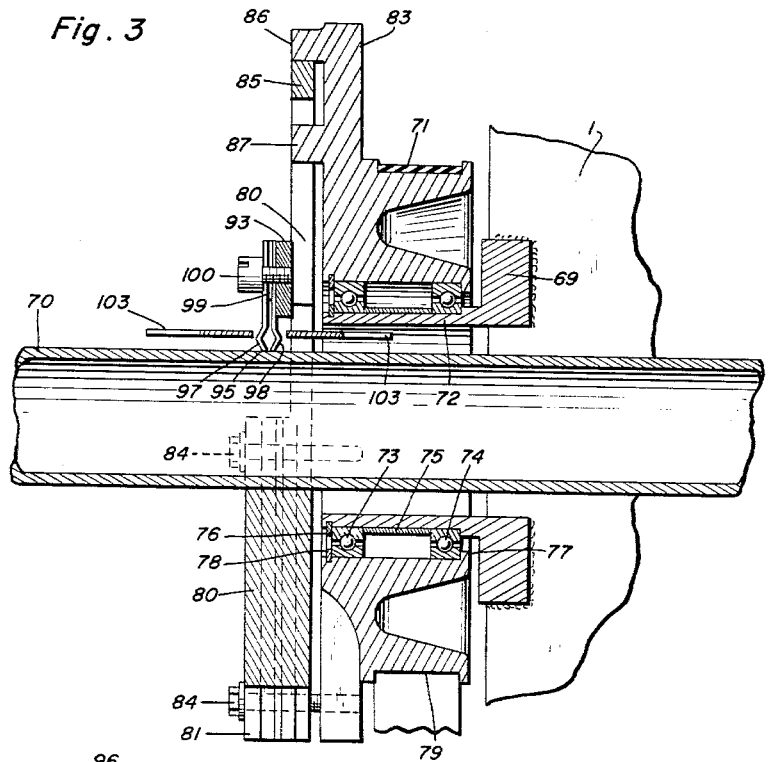
Figure 4:
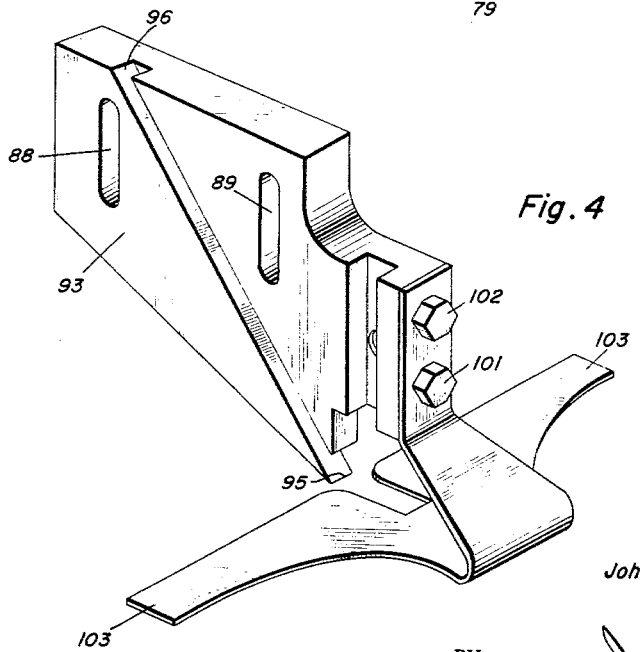

The foregoing and other features of the invention will be more fully described hereinafter and clarified by the accompanying drawings, in which: FIGURE 1 is a semi-schematic general elevation view of the subject machine in operating configuration with a coil of tubing in place on the machine, FIGURE 2 is an enlarged sectional view taken on line 2—2 of FIGURE 1, FIGURE 3 is a sectional view taken on line 3—3 of FIGURE 2, FIGURE 4 is an enlarged view of the cutting tool.

Figure 2:
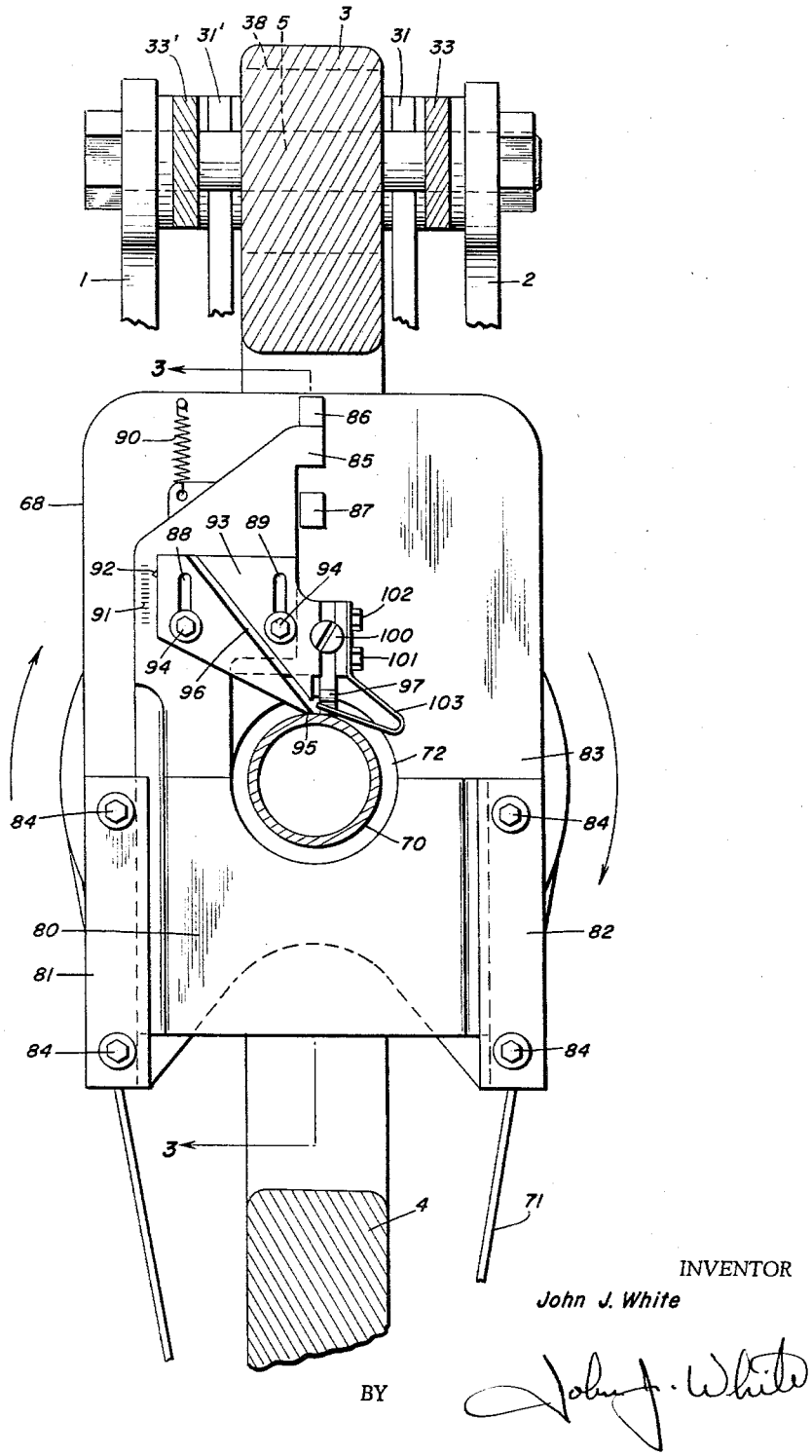

Looking first at FIGURE 1, 1 and 2 indicate parallel, plate-like main frame members of the machine (most of member 2 is broken away to show more clearly the mechanism lying between 1 and 2), 3 and 4 indicate upper and lower tube clamping and roller supporting members, 5 and 6 are combination tie-bolts and pivot pins running between members 1 and 2, 7 is an electric motor mounted on plate 8 which is welded or otherwise affixed to lower edges of 1 and 2. Motor 7 could also be mounted on upper edges of 1 and 2 or on the outer surface of 1 or 2. V-grooved roller 9 is rotatably mounted by means of pin 10 in a slot provided in right end of member 3. Grooved rollers 11, 12 and 13 are similarly mounted on member 4 by means of pins 14, 15 and 16. Parallel links or levers 17 and 18 (18 terminating at its right end in a pointer-like projection) are positioned on either side of 3 and 4 and are pivotally mounted between frame members 1 and 2 at 19 by means of two stub pivot pins extending from the opposing faces of 1 and 2. Members 17 and 18 also have close fitting holes which accept pins 10 and 14. Holes provided in 17 and 18 adjacent their right hand ends receive two trunnions 9 which project from either side of block 20 which also has a threaded bore engaged by adjusting screw 21. Adjusting screw 21 passes thru an unthreaded bore in pivoted block 22, shoulders or the like 23 and 24 on screw 21 prevent axial movement of 21 with respect to 22. Block 22 is trunnion mounted at 25 to frame members 1 and 2. Knurled knob 26 is provided on upper end of adjusting screw 21 to facilitate manual adjustment thereof.

Divided scale 26 is provided on frame member 1 adjacent pointed end of 18. A pair of links 27 (only one shown) are disposed between frame members 1 and 2, and links 17 and 18 and are pivotally attached to 17, 18 and 3 at their upper ends by means of pivot pin 10. A pair of links 27 are pivotally connected at their lower ends to a pair of links 28 (only one shown) which lie between 1 and 4, and 2 and 4, by means of pivot pins 29 (only one shown). Links or levers 28 are pivotally mounted to frame members 1 and 2 by means of pivot pin/tie bolt 6 which passes thru clearance hole 39 in 4. Right hand ends of links 28 have holes which engage pivot pin 16.

A pair of elongated levers or links 30 (only one shown) lie between link 17 and frame member 2, and link 18 and frame member 1, and are pivotally mounted to lower clamping member 4 by means of pivot pin 14. Upper ends of levers 30 pivotally engage lower ends of a pair of toggle links 31 and 31', which lie on either side of 3, by means of a pair of pivot pins 32 (only one shown). Upper ends of toggle links 31 and 31' are pivotally connected to the right hand ends of levers 33 and 33' by pivot pins 34 (only one shown). Levers 33 and 33' are pivotally mounted, approximately midway their lengths, to frame members 1 and 2 by means of pivot pin/tie bolt 5 which passes thru clearance hole 38 in 3. Left hand ends of levers 33 and 33' are pivotally connected, by means of pivot pin 35, to the upper ends of links 36 (only one shown) which are disposed on either side of upper clamping member 3 and are pivotally connected thereto at 37.

Lower ends of levers 30 are pivotally connected to toggle link 40 at 41. Link 40 is in turn pivotally connected at 47 to toggle link 42 which is fitted with foot treadle 43, stop lug 45, and is pivotally connected to axle 44. Tension return spring 46 is connected between joint 47 and machine supporting members 48 (only on shown) at 49. Axle 44 is mounted on members 48. Wheels 50 (only one shown) are rotatably retained on axle 44. Upper ends of members 48 are attached to frame members 1 and 2. A third machine support is provided by leg 51 which is attached at its upper end to frame member 1.

Workpiece supporting roller 52 is rotatably mounted on bracket 53 which is in turn supported by elongated member 54 which is retained in bore 55 in 4 by thumbscrew 56. Coil reel 57 is rotatably mounted on support arm 58 which is attached to frame member 1.

Mounted on motor 7 is lever operated switch 59. Push-pull link 60 is pivotally attached at one end to switch actuator 61 and at its other end to links 30. 62 is motor power inlet cord.

For manual operation a handcrank 63 is keyed to pin 15 which extends thru clearance hole 64 in link 27 and a similar clearance hole (not shown) in frame member 1. Roller 12 is also keyed to shaft or pin 15. Right end of double motor shaft 64 is fitted with a wire tube fitting cleaning brush 65. Left end of shaft 64 mounts another brush 66 and a drive sprocket or sheave 67.

Cutter assembly, shown generally as 68, is rotatably mounted on hollow "bearing block" 69 concentric with centerline of tubular workpiece 70 and is rotated by motor 7 thru sprocket or sheave 67, chain or belt 71 and a sprocket or sheave forming part of 68. The details of cutter assembly 68 are shown in FIGURES 2 and 3, wherein the cutter assembly is shown with tubular workpiece 70. 72 is a tube-like flange which is part of and projects from bearing block 69 which is rigidly secured to frame members 1 and 2. Bearings 73 and 74 are mounted on flange 72 by a snap ring 76. Cutter assembly 68 is retained on the bearings by shoulder 77 and snap ring 78. Sheave or sprocket 79 forms an integral part of 68 and is engaged by belt or chain 71. It would of course be an obvious substitution to replace the sheaves and belts with gears.

Cutting tool holder 80 is slidably retained between "V" mounting ways 81 and 82 which are attached to plate-like portion 83 of 68 by cap screws 84. Tool holder 80 is provided with projection 85 which extends between stop lugs 86 and 87 which project from 83. Tension spring 89 holds projection 85 of tool holder 80 against lug 86 when the machine is not in operation.

Cutting tool 93 is attached to tool holder 80 by cap screws 94. Slots 88 and 89 in cutting tool 93 permit its being adjusted to accommodate different workpiece diameters and wall thicknesses. This will be described in greater detail later in the specification. To aid in such adjustments an engraved scale 91 is provided on 80 and an index or pointer 92 is provided on 93. Scale 91 is divided in terms of workpiece diameter and subdivided in terms of workpiece wall thickness. Cutting tool 93 is configured to have a narrow cutting edge 95, chip disposal passage or slot 96, and a vertical (as viewed in FIG. 2) slot which receives two resilient cutting depth control and chamfering tools 97 and 98 which are spaced apart by spacer 99. Screw 100 which is threaded into a tapped hole in 93 retains 97, 98 and 99. The geometry of cutting edge 95 and cutting depth control and chamfering tools 97 and 98 is such that cutting edge 95 projects below the horizontal (as viewed in FIG. 2) lower surfaces of 97 and 98 by approximately .001" to .010". Thus it can be seen that amount of "infeed" of cutting edge 95 is limited in much the same fashion as the depth of cut is controlled in a conventional carpenter's block plane.

As shown in FIGURE 3, laterally resilient tools 97 and 98 have outwardly bowed portions which extend laterally beyond the width of cutting edge 95. Attached to cutter 93 by cap screws 101 and 102 is resilient member 103 which is "T" shaped in plan view and the cross of the "T" is bifurcated or slotted to permit 97 and 98 to pass thru it to rest on workpiece 70, and for another reason which will be explained later. The surface of 103 adjacent the periphery of workpiece 70 is stippled, serrated, or coated to provide an abrading surface which automatically prepares the confronting ends of the severed workpiece portions in the use of my machine.

The adjustment or "set-up" of the machine for a particular diameter and wall thickness tubular workpiece will now be described: adjustment knob 26 is rotated until pointer-like end of lever 18 is caused, by action of adjusting screw 21 and threaded, trunnion mounted block 20, to move until it is opposite the position on scale 26 corresponding to the diameter of the tubing to be cut. Assuming that the machine is being adjusted to cut a smaller diameter tubing than it had been cutting, levers 17 and 18 would be caused to rotate clockwise about pivot 10 moving rollers 9 and 11 equally closer to the centerline of rotation of 68. Links 27 would be moved down an equal amount and cause links 28 to rotate counterclockwise raising roller 13 the same amount as roller 11 was raised and roller 9 was lowered. Inasmuch as points 14 and 16 on tube clamping and roller supporting member 4 move equal amounts, roller 12 and "V" cross-section tube clamping areas 104 and 105, whose surfaces are tangent to the "V" grooves of rollers 11, 12 and 13, will also move up equal amounts.

Levers 33 and 33' are caused to rotate counterclockwise about pivot 5 by virtue of links 30, 31 and 31' being raised by motion of pivot pin 14. Pivot 35 moves down the same distance as roller 9, causing links 36 and pivot 37 to drop the same distance. "V" cross-section tube clamping area 106 will also drop the same distance. Thus it can be seen that the centerline between upper and lower clamping surfaces 106 and 107, and 104 and 105, and upper roller 9, and lower rollers 11, 12 and 13 will always coincide with the center of rotation of cutter assembly 68.

Upper surfaces of 4 lying between rollers 11 and 12, and 12 and 13 are also "V" grooved and are essentially tangent to the "V" peripheries of said rollers.

Having adjusted the tube straightening rolls and clamping means, there remains only the adjustment of the cutter before the machine can be put into operation cutting the new diameter of tubing. Screws 94 are loosened and cutter 93 is moved until index 92 is positioned opposite the markings on scale 91 corresponding to the diameter and wall thickness of the new tubing. Screws 94 are retightened and the machine is ready for operation.

After placing the new coil of tubing on reel 57, the operator should manually straighten, in a nominal fashion, a foot or two of the end of the new coil before inserting the end between rollers 9 and 12.

FIGURE 1 shows toggle links 31, 31', and 30 in the locked or operating position as if the operator were holding treadle 43 in the position shown with his foot. When loading or threading the machine with a new coil, or when advancing a new length of tubing to be cut, the operator will not be depressing treadle 43 and spring 46 will "break" toggle links 40 and 42, causing levers 30 to rotate counterclockwise about pivot 14 "breaking" toggle linkage composed of the upper ends of levers 30, 31 and 31', and causing levers 33 and 33' to rotate clockwise lifting links 36 and thereby lefthand end of clamping member 3.

The operator may now insert the end of the tube between rollers 9 and 12 and rotate crank 63 counterclockwise. Roller 12, having a knurled or stippled surface, will grip the tube and draw it between the rollers. The leading end of the tubing is forced to slide along the "V" upper surface of 4 between rollers 11 and 12, thence between clamping surfaces 105 and 107, over roller 11, thru cutter assembly 68, between clamping surfaces 104 and 106, and onto supporting roller 52. Soft temper tubing is straightened adequately by passing thru the rollers as described. If tubing other than "dead soft" temper is to be worked, a slight "over bending" may have to be imparted by the rolls to straighten it adequately. This could be accomplished by increasing the diameter of roller 9 and decreasing the diameter of roller 12.

Having fed the desired length of tubing (measured from its end to the point opposite cutting edge 95) into the machine, treadle 43 is depressed causing the tubing to be clamped firmly as shown in FIGURE 1. Clockwise rotation thus imparted to levers 30 and 30' causes link 60 to actuate switch 59, energizing motor 7. Motor 7 thru sheaves 67 and 79 and belt 71 causes cutter assembly 68 to rotate clockwise (as viewed in FIGURE 2). Since the weight of tool holder 80 disposed below the center of rotation of 68 exceeds the weight of the cutting tool and the portion of 80 disposed above said center line (as viewed in FIGURE 2), a centrifugal force is created by the rotation of 68 which causes tool holder 80 to overcome the restraint of spring 89 and move cutting edge 95 into contact with the periphery of tubular workpiece 70 and to dig into it until lower ends of 97 and 98 contact the periphery of 70.

As cutting edge 95 continues to orbit 70 a continuous shaving or chip is generated which is the width of 95 and of a thickness corresponding to the distance 95 projects below the lower ends of 97 and 98. As the resulting groove in periphery of 70 increases in depth due to this controlled cutting action, the sharp edges of outwardly bowed portions of 97 and 98, which extend laterally beyond the width of 95, bear resiliently against the sharp peripheral "corners" of the groove and break or chamfer said corners.

When tube 70 is completely severed, the aforementioned centrifugal force causes tool 93 to move abruptly further toward the center of 70 until projection 85 contacts stop lug 87. Tools 97 and 98 pass thru the resulting gap between the severed ends of 70 by virtue of being forced together by the tube ends.

At this point the upper angularly disposed edges of outwardly bowed portions of tools 97 and 98 bear resiliently against the sharp inside peripheral corners of the two pieces of tubing "breaking" or chamfering said corners. At this point also, the abrasively coated portion of member 103 contacts the periphery of tube 70 and abrades away any dirt and/or oxides and polishes both resulting tubing ends.

Foot treadle 43 is now released, ending the machine cycle by deenergizing the motor and releasing the clamps, allowing the finished piece of tubing to be removed.

Thus it can be seen that each machine cycle results in the production of the desired length of tubing, both ends of which are ready for immediate soldering without the necessity of performing any manual operations (the leading end of each piece having been processed during the preceding cycle).

The width of the slot in member 103 may be proportioned to leave a narrowing ring of oxide coating on the periphery of the tubes immediately adjacent their ends. This will, in effect, create a "dam" against the flow of molten solder past the end of the tube because the solder will not "wet" a contaminated surface and the surface tension of the molten solder will not permit it to flow thru the small clearance between the outside diameter of the tube and the inside diameter of the tube fitting unless the surfaces can be "wetted" by the solder. For this to be most effective the fitting should also have a corresponding "dam." This can be accomplished by equipping fitting cleaning brushes, etc. with depth stops.

The absence of such a "dam" can permit the complete stoppage of small fittings by the application of an excessive amount of solder and/or permit the formation of loose solder beads which can find their way into valves, compressors, etc. where they can do considerable damage.

It is felt that the application of tubing length measuring devices, automatic cut-off switches, pneumatic or hydraulic power for clamping, etc. are obvious expedients and have not been mentioned in order that the true invention not be obscured.

I claim:

1. A tube cutting machine comprising a frame, tube clamping means, a bearing mounted on said frame concentric with the centerline of said tube clamping means, cutting tool supporting means rotatably mounted on said bearing, means to rotate said cutting tool supporting means, a cutting tool including a cutting edge and counterweight moveably mounted on said cutting tool supporting means, said counterweight being disposed on the opposite side of said centerline from said cutting edge so that upon energization of said rotating means the centrifugal force generated by said counterweight orbiting said centerline causes said cutting edge to move into operative contact with the periphery of said tube.

2. The machine of claim 1 wherein said tube clamping means are disposed to grip said tube on both sides of said cutting tool.

3. The machine of claim 1 including cutting tool feed limiting means comprised of a pair of members disposed adjacent said cutting edge to contact the periphery of said tube and precede said cutting edge in its travel around the periphery of said tube, said pair of members being resilient in the direction of the axis of said tube and having outwardly bowed portions in the direction of the axis of said tube.

4. The machine of claim 3 wherein the radial distance from said centerline to the tube contacting ends of said pair of members exceeds the radial distance from said centerline to said cutting edge the difference between said radial distances automatically establishing the depth of cut per orbit of the cutting tool.

5. The machine of claim 4 wherein said outwardly bowed portions of said cutting tool feed limiting means project beyond the width of said cutting edge so as to operatively engage the corners of the groove generated in the periphery of said tube by said cutting edge whereby said corners are chamfered by the passage of said outwardly bowed portions over said corners.

6. The machine of claim 3 including abrasive means attached to said cutting tool disposed parallel to said centerline on both sides of said cutting edge so as to operatively contact the periphery of said tube during at least a portion of the cutting operation.

7. The machine of claim 5 including abrasive means attached to said cutting tool disposed parallel to said centerline on both sides of said cutting edge so as to operatively contact the periphery of said tube during at least a portion of the cutting operation.

8. The machine of claim 3 including roller means mounted on said frame disposed to straighten coiled tubing, crank means operatively associated with said roller means whereby said roller means may be rotated to draw tubing through said roller means.

References Cited by the Examiner

UNITED STATES PATENTS

| | | | |
|---|---|---|---|
| 610,526 | 9/1898 | Feister | 29—566 |
| 823,018 | 6/1906 | Wood | 72—161 |
| 1,178,805 | 4/1916 | Hickok | 29—566 |
| 1,256,556 | 2/1918 | Hedges | 29—565 |
| 1,610,463 | 12/1926 | Mirfield et al. | 29—33.15 |
| 2,616,156 | 11/1952 | Payne | 29—33.15 |
| 2,747,274 | 5/1956 | Willard | 82—4.3 |
| 2,932,083 | 4/1960 | DeNicolo | 29—417 |
| 2,965,960 | 12/1960 | Gronemeyer | 29—417 |
| 2,991,593 | 7/1961 | Cohen | 51—5 |

FOREIGN PATENTS 13,505   1/1851   Great Britain.

RICHARD H. EANES, Jr., *Primary Examiner.*

THOMAS H. EAGER, *Examiner.*